US006949613B2

(12) United States Patent
Haddleton

(10) Patent No.: US 6,949,613 B2
(45) Date of Patent: Sep. 27, 2005

(54) POLYMERIZATION INITIATOR AND USE

(75) Inventor: David Mark Haddleton, Kenilworth (GB)

(73) Assignee: University of Warwick, Coventry (GB)

( * ) Notice: Subject to any disclaimer, the term of this patent is extended or adjusted under 35 U.S.C. 154(b) by 0 days.

(21) Appl. No.: 10/276,266

(22) PCT Filed: Jun. 8, 2001

(86) PCT No.: PCT/GB01/02519

§ 371 (c)(1), (2), (4) Date: Aug. 28, 2003

(87) PCT Pub. No.: WO01/94424

PCT Pub. Date: Dec. 3, 2001

(65) Prior Publication Data

US 2004/0044156 A1 Mar. 4, 2004

(30) Foreign Application Priority Data

Jun. 9, 2000 (GB) ............................................. 0014225

(51) Int. Cl.[7] .................................................. C08F 4/42

(52) U.S. Cl. ......................... 526/90; 526/135; 526/126; 526/130; 526/145; 526/146; 526/147; 526/171; 526/172; 526/161; 526/169.1; 526/158; 526/159; 526/162

(58) Field of Search .......................... 526/90, 135, 126, 526/130, 145, 146, 147, 171, 172, 161, 169.1, 158, 159, 162; 502/158, 159, 162

(56) References Cited

U.S. PATENT DOCUMENTS 4,940,760 A 7/1990 Boettcher et al.

6,790,919 B2 9/2004 Matyjaszewski et al.

FOREIGN PATENT DOCUMENTS

| | | | |
|---|---|---|---|
| WO | WO 96/30421 | 10/1996 | |
| WO | WO 99/28352 | 6/1999 | |
| WO | WO 9928352 * | 6/1999 | ............. C08F/4/26 |

OTHER PUBLICATIONS

Wang et al., "Controlled/"Living" Radical Polymerization. Atom Transfer Radical Polymerization in the Prsence of Transition–Metal Complexes", J. Am. Chem. Soc., 117, pp. 5614–5615, 1995.

Patten et al., "Copper(I)–Catalyzed Atom Transfer Radical Polymerization", Acc. Chem. Res., 32, pp. 895–903, 1999.

Matyjaszewski, "Controlled radical polymerization", Current Opinion in Solid State & Materials Science, 1, pp. 769–776, 1996.

Sawamoto et al., "Living Radical Polymerization with Transition Metal Complexes", Kobunshi Ronbunshu, vol. 54, No. 12, pp. 875–885, 1997.

Kato et al., "Polymerization of Methyl Methacrylate with the Carbon Tetrachloride/Dichlorotris(triphenylphosphine)ruthenium(II)/Methylaluminum Bis(2,6–di–*tert*–butylphenoxide) Initiating System: Possibility of Living Radical Polymerization", Macromolecules, 28, pp. 1721–1723, 1995.

(Continued)

*Primary Examiner*—William K. Cheung
(74) *Attorney, Agent, or Firm*—Oliff & Berridge, PLC

(57) ABSTRACT

The application discloses supported initiators for transition metal mediated living free radical and/or atom transfer polymerisation comprising an initiator moiety attached to a support via a selectively cleavable link, and their use to produce polymers.

27 Claims, 8 Drawing Sheets

OTHER PUBLICATIONS

Figure 1:
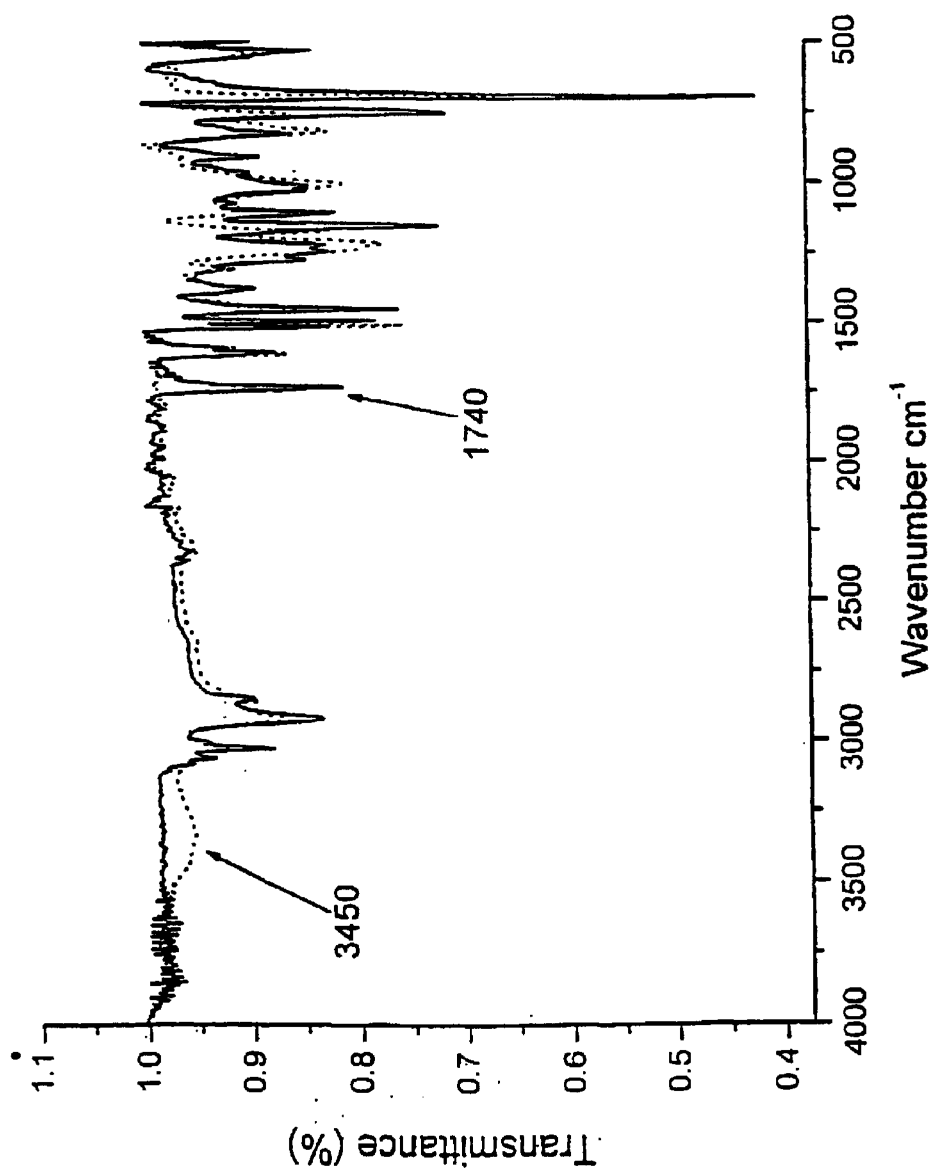

Percec et al., "Arenesulfonyl Halides: A Universal Class of Functional Initiators for Metal–Catalyzed "Living" Radical Polymerization of Styrene(s), Methacrylates, and Acrylates", J. Am. Chem. Soc., 120, pp. 305–316, 1998.

Granel et al., "Controlled Radical Polymerization of Methacrylic Monomers in the Presence of a Bis(ortho–chelated) Arylnickel(II) Complex and Different Activated Alkyl Halides", Macromolecules, 29, pp. 8576–8582, 1996.

Moineau et al., "Controlled Radical Polymerization of Methyl Methacrylate Initiated by an Alkyl Halide in the Presence of the Wilkinson Catalyst", Macromolecules, 31, pp. 542–544, 1998.

Haddleton et al., "Atom Transfer Polymerization of Methyl Methacrylate Mediated by Alkylpyridylmethanimine Type Ligands, Copper(I) Bromide, and Alkyl Halides in Hydrocarbon Solution", Macromolecules, 32, pp. 2110–2119, 1999.

Haddleton et al., "Atom Transfer Radical Polymerization of Methyl Methacrylate Initiated by Alkyl Bromide and 2–Pyridinecarbaldehyde Imine Copper(I) Complexes", Macromolecules, 30, pp. 2190–2193, 1997.

Uegaki et al., "Living Radical Polymerization of Methyl Methacrylate with a Zerovalent Nickel Complex, $Ni(PPh_3)^{14}$", Journal of Polymer Science: Part A: Polymer Chemistry, vol. 37, pp. 3003–3008, 1999.

Angot et al., "Atom Transfer Radical Polymerization of Styrene Using a Novel Octafunctional Initiator: Synthesis of Well–Defined Polystyrene Stars", Macromolecules, 31, pp. 7218–7225, 1998.

Ueda et al., "Calixarene–Core Multifunctional Initiators for the Ruthenium–Mediated Living Radical Polymerization of Methacrylates", Macromolecules, 31, pp. 6762–6768, 1998.

Haddleton et al., "Atom transfer polymerisation with glucose and cholesterol derived initiators", New J. Chem. 23, pp. 477–479, 1999.

Matyjaszewski, "Transition Metal Catalysis in Controlled Radical Polymerization: Atom Transfer Radical Polymerization", Chem. Eur. J., 5, No. 11, pp. 3095–3102, 1999.

Matyjaszewski et al., "Synthesis of Block, Graft and Star Polymers from Inorganic Macroinitiators", Appl. Organometal Chem, 12, pp. 667–673, 1998.

Jankova et al., "Synthesis by ATRP of poly(ethylene–*co*–butylene)–*block*–polystyrene, poly(ethylene–*co*–butylene)–*block*–poly(4–acetoxystyrene) and its hydrolysis product poly(ethylene–*co*–butylene)–*block*–poly(hydroxystyrene)", Macromol. Rapid Commun., 20, No. 4, pp. 219–223, 1999.

Yamamoto et al., "Preparation of well–defined polymer brushes on silicon substrate by the surface–initiated ATRP technique and their characterization", Abstracts of Papers of the American Chemical Society, 218, POLY–487, 1999.

Minoda et al., "Atom–transfer radical polymerization of poly(vinyl ether) macromonomers", Abstracts of Papers of the American Chemical Society, 218, POLY–486, 1999.

Wang et al., "Facile Synthesis of Acidic Copolymers via Atom Transfer Radical Polymerization in Aqueous Media at Ambient Temperature", Macromolecules, 33 pp. 255–257, 2000.

Ohno et al., "Synthesis of a Well–Defined Glycopolymer by Atom Transfer Radical Polymerization", Journal of Polymer Science: Part A: Polymer Chemistry, vol. 36, pp. 2473–2481, 1998.

Haddleton et al., "3–Aminopropyl Silica Supported Living Radical Polymerization of Methyl Methacrylate: Dichlorotris(triphenylphosphine)ruthenium(II) Mediated Atom Transfer Polymerization", Macromolecules, 32, pp. 4769–4775, 1999.

Haddleton et al., "Atom transfer polymerization of methyl methacrylate mediated by solid supported copper catalysts", Chem. Commun., pp. 99–100, 1999.

Kickelbick et al., "Immobilization of the Copper Catalyst in Atom Transfer Radical Polymerization", Macromolecules, 32, pp. 2941–2947, 1999.

Haddleton et al., "Copper(I)–Mediated Living Radical Polymerization under Fluorous Biphasic Conditions", J. Am. Chem. Soc., 122, pp. 1542–1543, 2000.

Merrifield, "Solid Phase Peptide Synthesis I. The Synthesis of a Tetrapeptide", J. Am. Chem. Soc., vol. 85, pp. 2149–2154, 1963.

Wang, "þ–Alkoxybenzyl Alcohol Resin and þ–Alkoxybenzyloxycarbonylhydrazide Resin for Solid Phase Synthesis of Protected Peptide Fragments", Journal of the American Chemical Society, 95:4, pp. 1328–1333, 1973.

Haddleton et al., "Phenolic Ester–Based Initiators for Transition Metal Mediated Living Polymerization", Macromolecules, 32, pp. 8732–8739, 1999.

Webster, "Living Polymerization Methods", Science, vol. 251, pp. 887–893, 1991.

Matyjaszewski, "Mechanistic and Synthetic Aspects of Atom Transfer Radical Polymerization", Pure Appl. Chem., A34(10), pp. 1785–1801, 1997.

Kotani et al., "Living Radical Polymerization of Alkyl Methacrylates with Ruthenium Complex and Synthesis of Their Block Copolymers", Macromolecules, 29, pp. 6979–6982, 1996.

* cited by examiner a)

b)

c)

d)

POLYMERIZATION INITIATOR AND USE

The current application relates to supported polymerisation initiators and their use to produce polymers.

Transition metal-mediated living radical polymerization has developed as an efficacious technique for the controlled polymerization of (meth)acrylic and styrenic monomers under free-radical-like conditions. A wide variety of transition metal complexes/ligand have already been reported[1,2,3,4,5,6,7,8,9,10,11]. This chemistry is relatively easy to carry out, and very robust with tolerance to most functional groups which may be present in reagents or due to impurities. These types of polymerisations lead to an unprecedented range of controlled architecture polymers including star polymers[12,13,14], block copolymers[15,16,17], polymer brushes[18,19], amphiphilic polymers[20], glycopolymers[21], etc. One of the major drawbacks of this chemistry is the high levels of transition metal salt used with often equimolar concentrations required with respect to initiator causing reaction solutions to be highly colored usually necessitating a secondary process for catalyst removal. A number of strategies have been reported to alleviate this problem including immobilization of the catalyst on insoluble supports[22,23,24], e.g. silica gel and the use of fluorous biphase reaction media[25] which allow efficient separation of the catalyst and for the potential for catalyst recycling.

The use of insoluble supports to mediate organic transformations has been developed extensively over recent years. In particular combinatorial and fast throughput synthesis techniques have become commonplace whereby the organic substrate is transformed whilst immobilized prior to cleavage and subsequent recovery. Indeed this is the basis for automated peptide synthesis that is routinely carried out by solid phase synthetic methods based on sequential addition of amino acids to an insoluble crosslinked polymeric support. This chemistry has grown from the pioneering work of Merrifield[26] with "Merrifield" chloromethyl functionalised beads being utilized for more than 20 years for the synthesis of medium sized peptide using the Boc strategy. Probably the most utilized solid supported poly(peptide) synthesis is now based on Fmoc chemistry for routine peptide synthesis. The most commonly used resin for Fmoc chemistry is Wang resin[27] which is also based on crosslinked poly(styrene) onto which an acid-labile linker has been attached allowing cleavage of products by a simple acid wash. The available functional group on the Wang resin is a benzylic alcohol, with a range of loadings/resin types readily available. This chemistry can be carried out in batch and continuous and as such Wang resin chemistry has been extensively developed. Although this chemistry is now considered almost routine for the synthesis of certain biological polymers (or synthetic polymers with biological activity). The inventors have developed the transformation of hydroxyl groups into activated alkyl halide based initiators for living radical polymerisation for homogeneous reactions[28]; the inventors envisage that they, would be able to take advantage of the tremendous advances made in resin development for biological polymer synthesis.

Supported polymer synthesis, as opposed to supported catalysis e.g. Ziegler-Natta polymerisation, is most ideally suited to addition polymerisation, which precludes the need for addition, and removal of protecting groups facilitating the synthesis. The main reason for this not being carried out to date is probably that living chain polymerisation would be required and most living polymerisation chemistry is not tolerant of most functional groups and or protic impurities routinely present in solvents and other reagents[29].

The use of polymeric solid support (resin beads) for organic synthesis relies on three interconnected requirements: preferably, i) a cross-linked insoluble but solvent swellable polymeric material that is inert to the conditions of synthesis, ii) some means of linking the to the solid phase that permit selective cleavage to give the final product, iii) a successful synthetic procedure compatible with the linker and the solid phase. One of the most commonly available resin used is Wang resin which is based on cross-linked polystyrene onto which a 4-hydroxybenzyl alcohol moiety has been attached (Scheme 1).

Scheme 1.

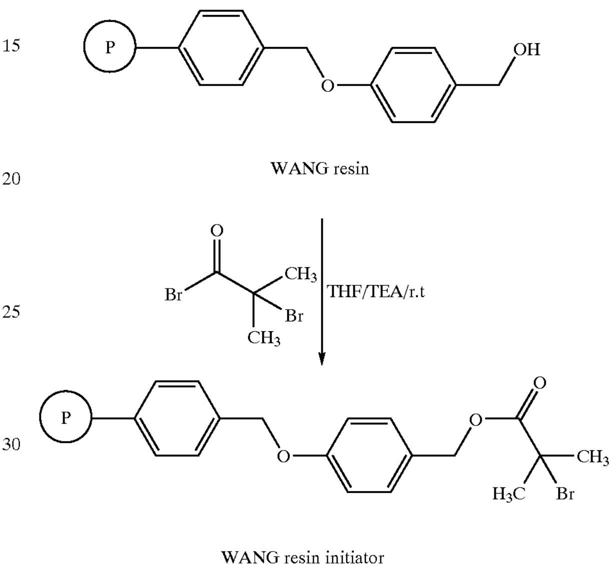

Synthesis of a solid support initiator based on Wang resin for ATP of methacrylates.

It seems that Wang resins are ideally suited to functionalisation with functionality suitable for living radical polymerisation. This then allows for polymers to be grown from the surface of the resin prior to washing out the catalyst/excess monomers and cleavage of the product so as to harvest relatively pure polymers. The potential for automating this process is also attractive. The main advantage of this approach is the elimination of excess of reagents by simple filtration and solvent washes. The product is isolated by cleavage, for example under relatively mild conditions, of the ester linkage between the resin and the copolymer.

The first aspect of the invention provides a supported initiator for transition metal mediated living free radical and/or atom transfer polymerisation comprising an initiator moiety attached to a support via a selectively cleavable link.

Such a supported initiator allows polymers to be grown on the support and then cleaved from the support using the selectively cleavable link. The selectively cleavable link may be any bond which may be chemically or physically broken substantially without breaking the polymer attached to the support. This allows the polymer to be released and the support separated from the polymer.

For example, the selectively cleavable link may be an acid-labile group such as an ester group. Such groups are selectively cleavable by using an acid such as trifluoroacetic acid.

The initiator may be used for living free radical polymerisation, of the sort demonstrated in, for example, WO 99/28352 or atom transfer polymerisation, of the sort demonstrated in WO 96/30421.

Preferably the initiator moiety comprises an activated halogen atom. Such an atom may be defined as a halogen atom $\alpha$ to an electron withdrawing group capable of stabilising a partial radical or a free radical formed on an adjacent carbon group. The initiator moiety may comprise a homolytically cleavable bond with a halogen atom.

Homolytically cleavable means a bond which breaks without integral charge formation on either atom by homolytic fission. Conventionally this produces a radical on the compound and a halogen atom radical. For example:

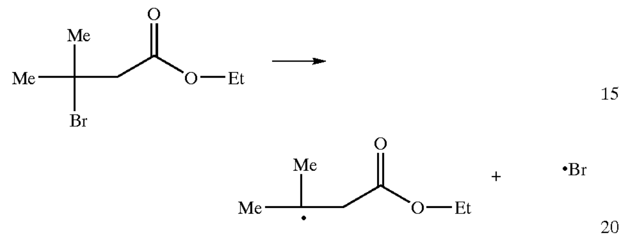

However, the increase in the rate of reaction observed by the inventors with free-radical inhibitors indicates that true free-radicals do not appear to be formed using some of the catalysts below. It is believed that this occurs in a concerted fashion whereby the monomer is inserted into the bond without formation of a discrete free radical species in the system. That is during propagation this results in the formation at a new carbon-carbon bond and a new carbon-halogen bond without free-radical formation. The mechanism involves bridging halogen atoms for example:

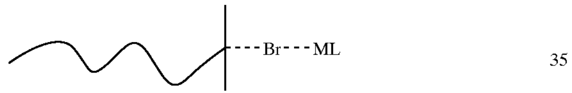

where:

ML is a transmission metal-diimine complex.

A "free-radical" is defined as an atom or group of atoms having an unpaired valence electron and which is a separate entity without other interactions.

Preferably the halogen atom is selected from F, Cl, Br and I.

The initiator moiety may have the formula:

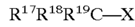

$R^{17}R^{18}R^{19}C$—X wherein:

X is selected from Cl, Br, I, $OR^{20}$, $SR^{21}$, $SeR^{21}$, OP(=O)$R^{21}$, OP(=O)$R^{21}$, OP(=O)$(OR^{21})_2$, OP(=O)$O^{21}$, O—N$(R^{21})_2$ and S—C(=S)N$(R^{21})_2$, where $R^{20}$=a $C_1$ to $C_{20}$ alkyl where one or more of the hydrogen atoms may be independently replaced by halide, $R^{21}$ is aryl or a straight or branched $C_1$–$C_{20}$ alkyl group, and where an $(NR^{21})_2$ group is present, the two $R^{21}$ groups may be joined to form a 5- or 6-membered heterocyclic ring; and $R^{17}$, $R^{18}$ and $R^{19}$ are each independently selected from H, halogen, $C_1$–$C_{20}$ alkyl, $C_3$–$C_8$ cycloalkyl, C=$YR^{22}$, C(=Y)$NR^{23}R^{24}$, COCl, OH, CN, $C_2$–$C_{20}$ alkenyl, $C_2$–$C_{20}$ alkynyl, oxiranyl, glycidyl, aryl, heterocyclyl, aralkyl, aralkenyl, $C_1$–$C_6$ alkyl in which 1 or more hydrogen atoms are replaced with halogen and $C_1$ to $C_6$ alkyl substituted with from 1 to 3 substitutions selected from alkoxyl, aryl, heterocyclyl, C(=Y)$R^{22}$, C(=Y)$NR^{23}R^{24}$, oxiranyl and glycidyl;

where $R^{22}$ is $C_1$ to $C_{20}$ alkyl, $C_1$ to $C_{20}$ alkoxy, aryloxy or heterocyclyloxy; and $R^{23}$ and $R^{24}$ are independently H, $C_1$ to $C_{20}$ alkyl, or $R^{23}$ and $R^{24}$ may be joined together to form an alkylene group of 2 to 5 carbon atoms, thus forming a 3- to 6-membered ring;

where Y may be $NR^{25}$ or O, and $R^{25}$ is H, straight or branched $C_1$ to $C_{20}$ alkyl or aryl;

such that no more than two of $R^{17}$, $R^{18}$ and $R^{19}$ are H, and wherein at least one of $R^{17}$, $R^{18}$ or $R^{19}$ is attached to the support, optionally via the selectively cleavable link.

The initiator moiety may also be selected from

Formula 2

RX

Formula 3

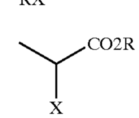

Formula 4

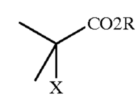

Formula 5

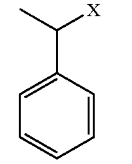

Formula 6

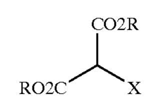

Formula 7

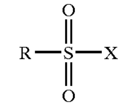

Formula 8

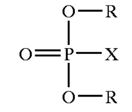

Formula 9

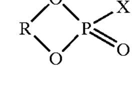

Formula 10

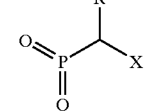

Formula 11

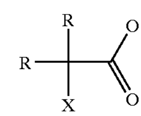

Formula 12

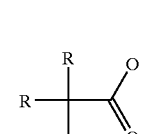

where: R is independently selectable and is selected from straight, branched or cyclic alkyl, hydrogen, substituted alkyl, hydroxyalkyl, carboxyalkyl or substituted benzyl, wherein at least one R is attached to the support via the selectively cleavable link; and X is a halide.

The initiator may especially-be selected from formulae 13–23. The initiator may be linked via one of the carbon-containing side-chains on the initiator to the support via a selectively cleavable link.

Formula 13

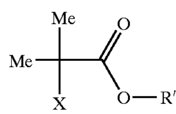

where:

X Br, I or Cl, preferably Br

R'=—H.

—$(CH_2)_p R^{11}$ (where m is a whole number, preferably p=1 to 20, more preferably 1 to 10, most preferably 1 to 5, $R^{11}$=H, OH, COOH, halide, $NH_2$, $SO_3$, COX— where X is Br, I or C) or:

Formula 14

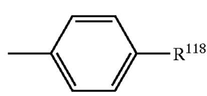

$R^{111}$=—COOH, —COX (where X is Br, I, F or Cl), —OH, —$NH_2$ or —$SO_3H$, especially 2-hydroxyethyl-2'-methyl-2'bromopropionate.

Formula 15

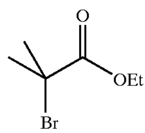

Formula 16

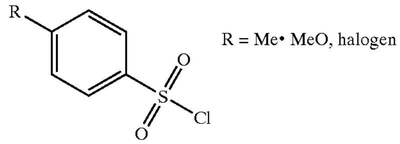

Especially preferred examples of Formula 16 are:

Formula 16A

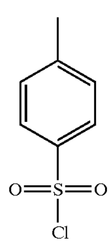

-continued

Formula 16B

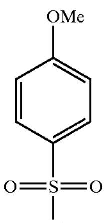

Formula 17

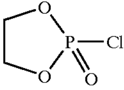

Formula 18

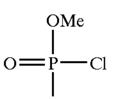

Formula 19

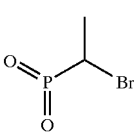

Formula 20

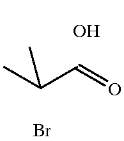

Formula 21

OH

Br

Formula 22

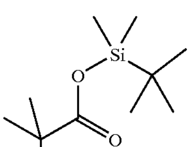

and

Formula 23

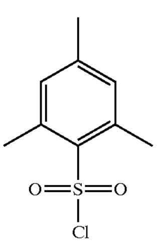

The careful selection of functional alkyl halides allows the production of terminally functionalised polymers. For example, the selection of a hydroxy containing alkyl bromide allows the production of α-hydroxy terminal polymers. This can be achieved without the need of protecting group chemistry.

The supported initiator may also comprise an initiator moiety of 1,1,1-trichloroacetone.

Further suitable initiators which may be attached to a support are disclosed in WO 96/30421.

The inventors have found that changing the concentration of the initiator on the support affects the overall kinetic of polymerisation. A concentration of initiator of less than 4 mmol $g^{-1}$ with respect to the total mass of the support produces improved PDI (polymer dispersity index) numbers. More preferably the loading is less than 3, less than 2 or less than 1 mmol $g^{-1}$.

Preferably the support is in the form of a sheet or bead. Beads are especially preferable since they have a high surface area The support may be made of an inorganic material such as silica Alternatively, the support may be an organic material such as a cross-linked organic polymer. Most preferably the cross-linked organic polymer is poly(styrene-w-divinylbenzone), especially of the sort known as Wang resins.

It is especially preferable that the support is porous or macroporous. This allows initiators to be produced within the support and allows supports with a high surface area to be produced. Similarly, solvent-swellable supports are also preferable since they allow the production of supported initiators having a high surface area.

Most preferably the supported initiator has the formula:

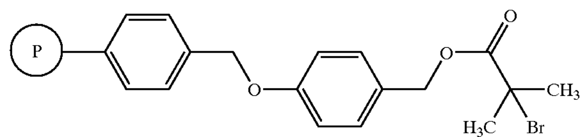

where P is a polymeric support.

A further aspect of the invention provides for the use of an initiator according to the first aspect of the invention in the synthesis of a polymer.

A further aspect of the invention provides a method for polymerising one or more olefinically unsaturated monomers comprising the steps of:

(i) providing a supported initiator according to the first aspect of the invention;

(ii) reacting the supported initiator with at least one monomer in the presence of a catalyst to form a polymer attached to the support; and (iii) removing the support from the polymer by cleaving the selectively cleavable link.

Preferably the polymer is cleaved from the support by selectively cleaving with acid, such as trifluoroacetic acid.

Preferably the monomer is methacrylate, acrylate or styrene. Acrylamide, methacrylamide or acrylonitrile amy also be used. Alternative monomers also include dienes such as butadiene, vinylether or vinylacetate.

Examples of olefinically unsaturated monomers that may be polymerised include methyl methacrylate, ethyl methacrylate, propyl methacrylate (all isomers), butyl methacrylate (all isomers), and other alkyl methacrylates; corresponding acrylates; also functionalised methacrylates and acrylates including glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2{=}C(Hal)_2$ where each halogen is independently Cl or F; optionally substituted butadienes of the formula $CH_2{=}C(R^{15})\,C(R^{15}){=}CH_2$ where $R^{15}$ is independently H, C1 to C10 alkyl, Cl, or F; sulphonic acids or derivatives thereof of formula $CH_2{=}CHSO_2OM$ wherein M is Na, K, Li, $N(R^{16})_4$ where each $R^{16}$ is independently H or Cl or alkyl, D is COZ, ON, $N(R^{16})_2$ or $SO_2OZ$ and Z is H, Li, Na, K or $N(R^{16})_4$; acrylamide or derivatives thereof of formula $CH_2{=}CHCON(R^{16})_2$ and methacrylamide or derivative thereof of formula $CH_2{=}C(CH_3)CON(R^{16})_2$. Mixtures of such monomers may be used.

Preferably, the monomers are commercially available and may contain a free-radical inhibitor such as 2,6-di-tert-butyl-4-methylphenol or methoxyphenol.

A gradient polymer may be produced by reacting the supported initiator with a first monomer and then adding a second monomer prior to completion of the polymerisation with the first monomer. Alternatively, a block polymer may be produced by reacting the supported initiator with a first monomer, removing unreacted first monomer before termination of its polymerisation reaction; and adding a second monomer to the reaction mixture to form the block copolymer. The block copolymer is then removed from the resin by means of cleavage of the selectively cleavable link in either case, the second polymer may be added at 75, 80, 85, 90 or 95% completion of the polymerisation of the first monomer.

Reaction may take place with or without the presence of a solvent. Suitable solvents in which the catalyst, monomer and polymer products are sufficiently soluble for reactions to occur include water, protic and non-protic solvents including propionitrile, hexane, heptane, dimethoxyethane, diethoxyethane, tetrahydrofurane, ethylacetate, diethylether, N,N-dimethylformamide anisole acetonitrile diphenylether, methylisobtyrate, butan-2-one, toluene and xylene. Especially preferred solvents are xylene and toluene. Preferably the solvents are used at least 1% by weight, more preferably at least 10% by weight.

Preferably the catalyst comprises a ligand which is any N-, O-, P- or S-containing compound which can coordinate in a δ-bond to a transition metal or any carbon-containing compound which can coordinate in a π-bond to the transition metal, such that direct bonds between the transition metal and growing polymer radicals are not formed.

The catalyst may also comprise a first compound $$MY$$

where:

M is a transition metal having an oxidation state which is capable of being oxidised by one formal oxidation state, Y is a mono, divalent or polyvalent counterion.

The catalyst may also be defined by the formula:

$$[ML_m]^{n+}A^{n-}$$

where:

M=a transition metal having an oxidation state which is capable of being oxidised by one formal oxidation state, L=an organodiimine where at least one of the nitrogens of the diimine is not part of an aromatic ring, A=anion, n=integer of 1 to 3, m=an integer of 1 to 2.

The metal ion may be attached to a coordinating ligand, such as $(CH_3CN)_4$. Y may be chosen from Cl, Br, F, I, $NO_3$, $PF_6$, $BF_4$, $SO_4$, CN, SPh, SCN, SePh or triflate ($CF_3SO_3$). Copper (I) triflate may be used. This is available in the form of a commercially available benzene complex $(CF_3SO_3Cu)_2$ $C_6H_6$. The especially preferred compound used is Cu Br.

A may be F, Cl, Br, I, N, $O_3$, $SO_4$ or $CuX_2$ (where X is a halogen).

The transition metal may be selected from $Cu^{1+}$, $Cu^{2+}$, $Fe^{2+}$, $Fe^{3-}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{3+}$, $Mn^{4+}$, $Rh^{3+}$, $Rh^{4+}$, $Re^{2+}$, $Re^{3+}$, $Co^{-}$, $Co^{2+}$, $V^{2+}$, $V^{3+}$, $Zn^{-}$, $Zn^{2+}$, $Au^{+}$, $Au^{2+}$, $Ag^{+}$ and $Ag^{2+}$.

Preferably the organodiimine has a formula selected from:

1,4-diaza-1,3-butadiene

Formula 24

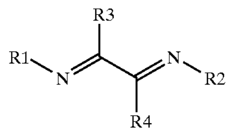

a 2-pyridinecarbaldehyde imine

Formula 25

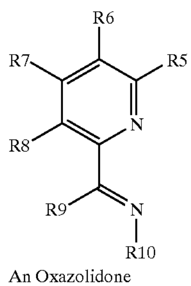

An Oxazolidone

Formula 26

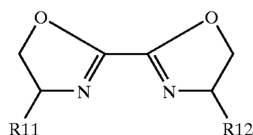

or a Quinoline Carbaldehyde

Formula 27

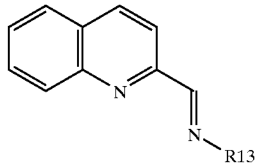

where $R_1$, $R_2$, $R_{10}$, $R_{11}$, $R_{12}$ and $R_{13}$ may be varied independently and $R_1$, $R_2$, $R_{10}$, $R_{11}$, $R_{12}$ and $R_{13}$ may be $H^-$, straight chain, branched chain or cyclic saturated alkyl, hydroxyalkyl, carboxyalkyl, aryl (such as phenyl or phenyl, substituted where substitution is as described for $R_4$ to $R_9$), $CH_2Ar$ (where Ar=aryl or substituted aryl) or a halogen. Preferably $R_1$, $R_2$, $R_{10}$, $R_{11}$, $R_{12}$ and $R_{13}$ may be a $C_1$ to $C_{20}$ alkyl, hydroxyalkyl or carboxyalkyl, in particular $C_1$ to $C_4$ alkyl, especially methyl or ethyl, n-propylisopropyl, n-butyl, sec-butyl, tert butyl, cyclohexyl, 2-ethylhexyl, octyl decyl or lauryl.

$R_1$, $R_2$, $R_{10}$, $R_{11}$, $R_{12}$ and $R_{13}$ may especially be methyl.

$R_3$ to $R_9$ may independently be selected from the group described for $R_1$, $R_2$, $R_{10}$, $R_{11}$, $R_{12}$ and $R_{13}$ or additionally $OCH_{2n+1}$ (where n is an integer from 1 to 20), $NO_2$, CN or O=CR (where R=alkyl, benzyl $PhCH_2$ or a substituted benzyl, preferably a $C_1$ to $C_{20}$ alkyl, especially a $C_1$ to $C_4$ alkyl).

Furthermore, the compounds may exhibit a chiral centre α to one of the nitrogen groups. This allows the possibility for polymers having different stereochemistry structures to be produced.

Compounds of general Formula 25 may comprise one or more fused rings on the pyridine group.

One or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups may be $C_5$ to $C_8$ cycloalkyl, cycloalkenyl, polycycloalkyl, polycycloalkenyl or cyclicaryl, such as cyclohexyl, cyclohexenyl or norborneyl.

Preferred ligands include:

Preferred ligands include:

Formula 28

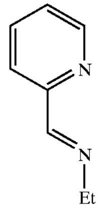

Formula 29

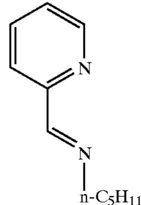

Formula 30

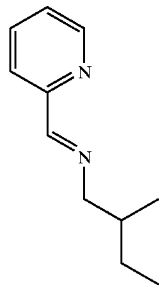

Formula 31

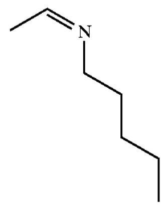

Formula 32

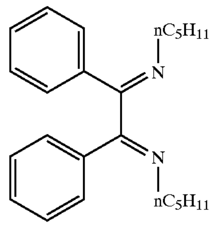

-continued
Formula 33
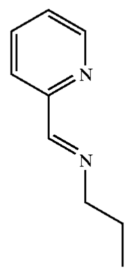
Formula 34
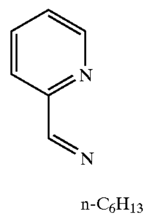
Formula 35
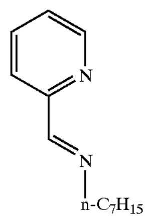
Formula 36
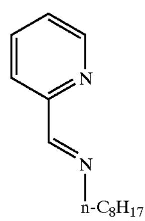
Formula 37
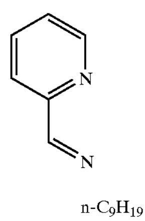
Formula 38
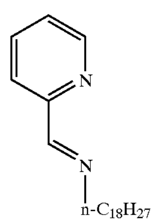
Formula 39
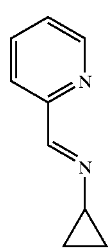
-continued
Formula 40
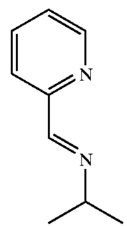
Formula 41
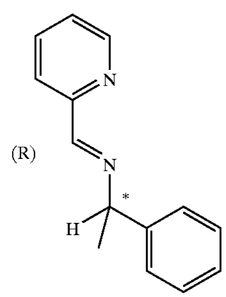
Formula 42
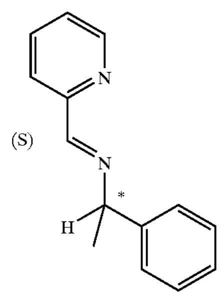
Formula 43
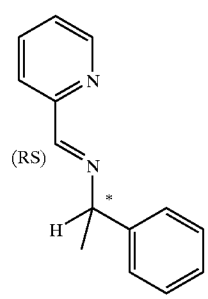
Formula 44
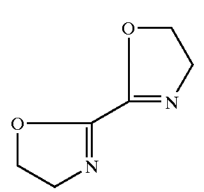
Formula 45
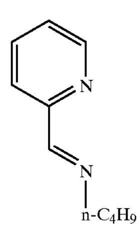

-continued

Formula 46

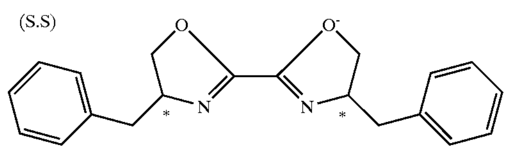

Formula 47

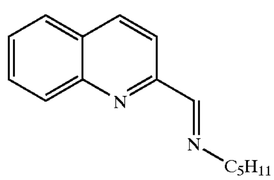

Formula 48

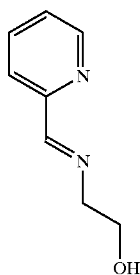

Formula 49

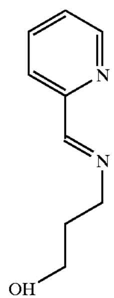

Formula 50

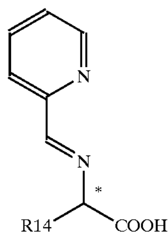

and

Formula 51

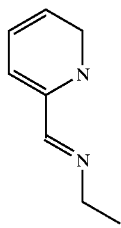

COOH where: * indicates a chiral centre

R14=Hydrogen, $C_1$ to $C_{10}$ branched chain alkyl, carboxy- or hydroxy-$C_1$ to $C_{10}$ alkyl.

Preferably the catalyst is

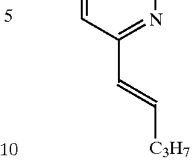

with Cu Br

Most preferably the initiator has the general formula:

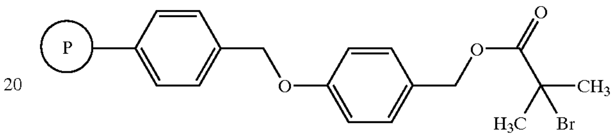

where P is a polymeric support.

The amount of the initiator loading on the support preferably is less than 4 mmol $g^{-1}$, with respect to the total mass of the support, of initiating sites. More preferably the amount of loading is less than 4, most preferably less than 2, especially less than 1 mmol $g^{-1}$ of initiating sites. Preferably the minimum amount of initiator is 0.01 mmol/g The invention further provides a method for synthesizing a supported initiator as defined according to the first aspect of the invention comprising the steps of:

(i) providing a support having one or more reactive groups; and (ii) reacting the support with an initiator precursor to form the supported initiator.

Preferably, the support has formula:

S—OH where S is the support and the initiator precursor has formula:

I-Hal, where I is the initiator and Hal is a halogen, and the halogen and hydroxyl groups react to form formula:

S—O—I

The method preferably comprises reacting:

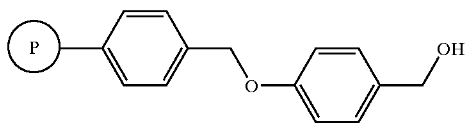

-continued where

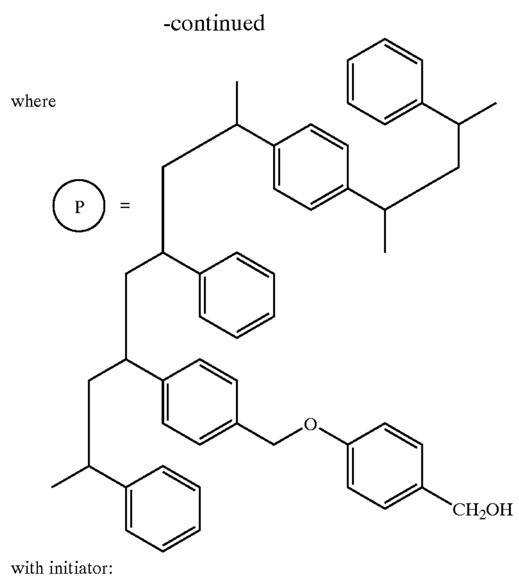

with initiator:

$$\mathrm{Br{-}C(=O){-}C(CH_3)_2Br}$$

to form a supported initiator of formula:

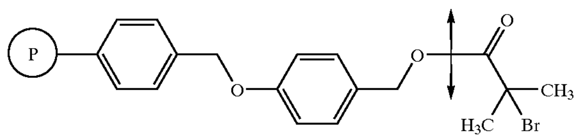

where the arrow indicates the site of the selectively cleavable link.

A still further aspect of the invention provides supported initiators according to the first aspect of the invention additionally comprising a polymer extending from the initiator moiety.

The invention will now be described by way of example only with reference to the following figures FIG. 1. FT-IR spectra overlay of the Wang resin before (dash line) and after (straight-line) esterification reaction.

Figure 2:
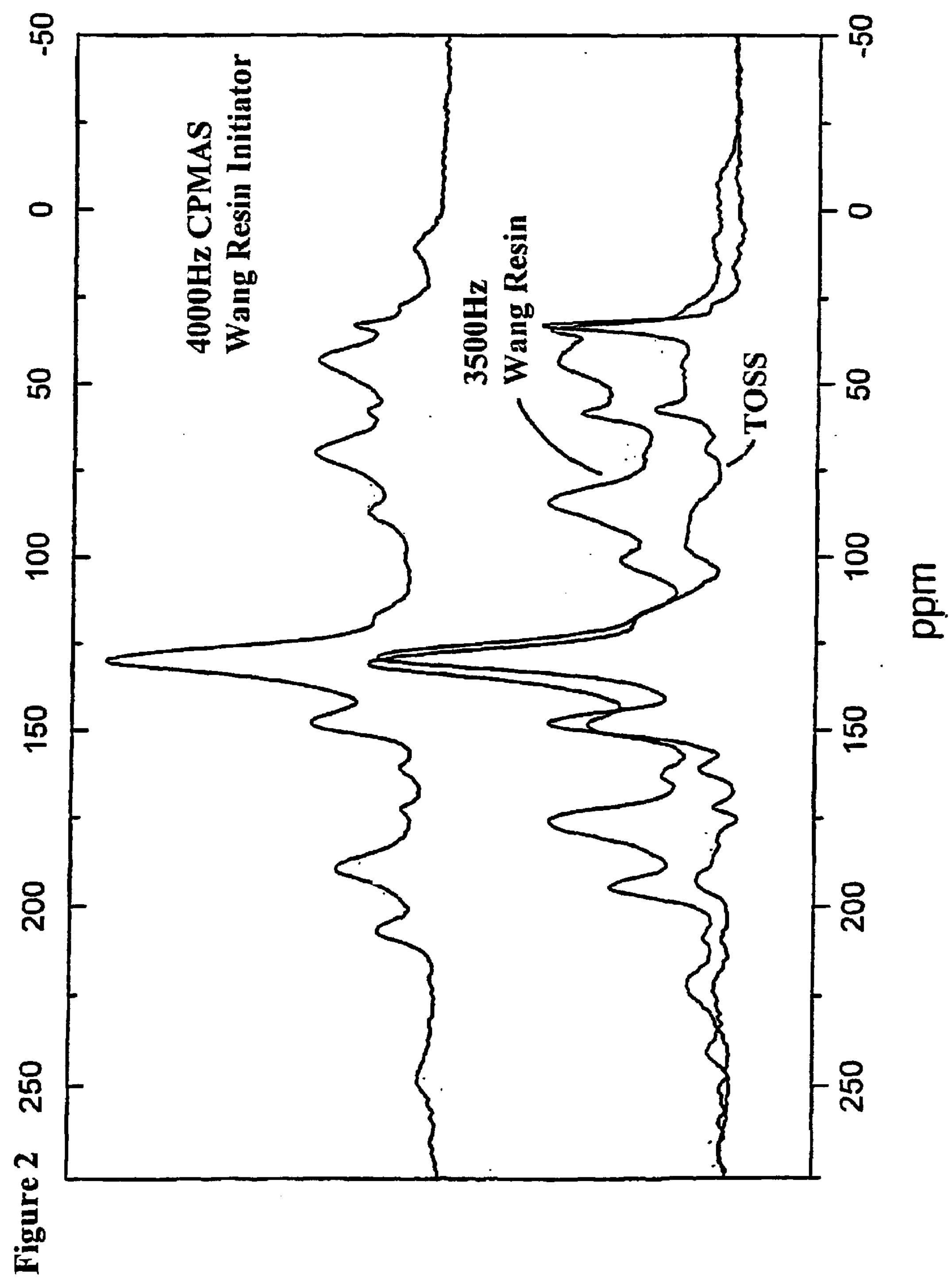

FIG. 2. Solid state NMR of Wang resin supported initiator.

Figure 3:
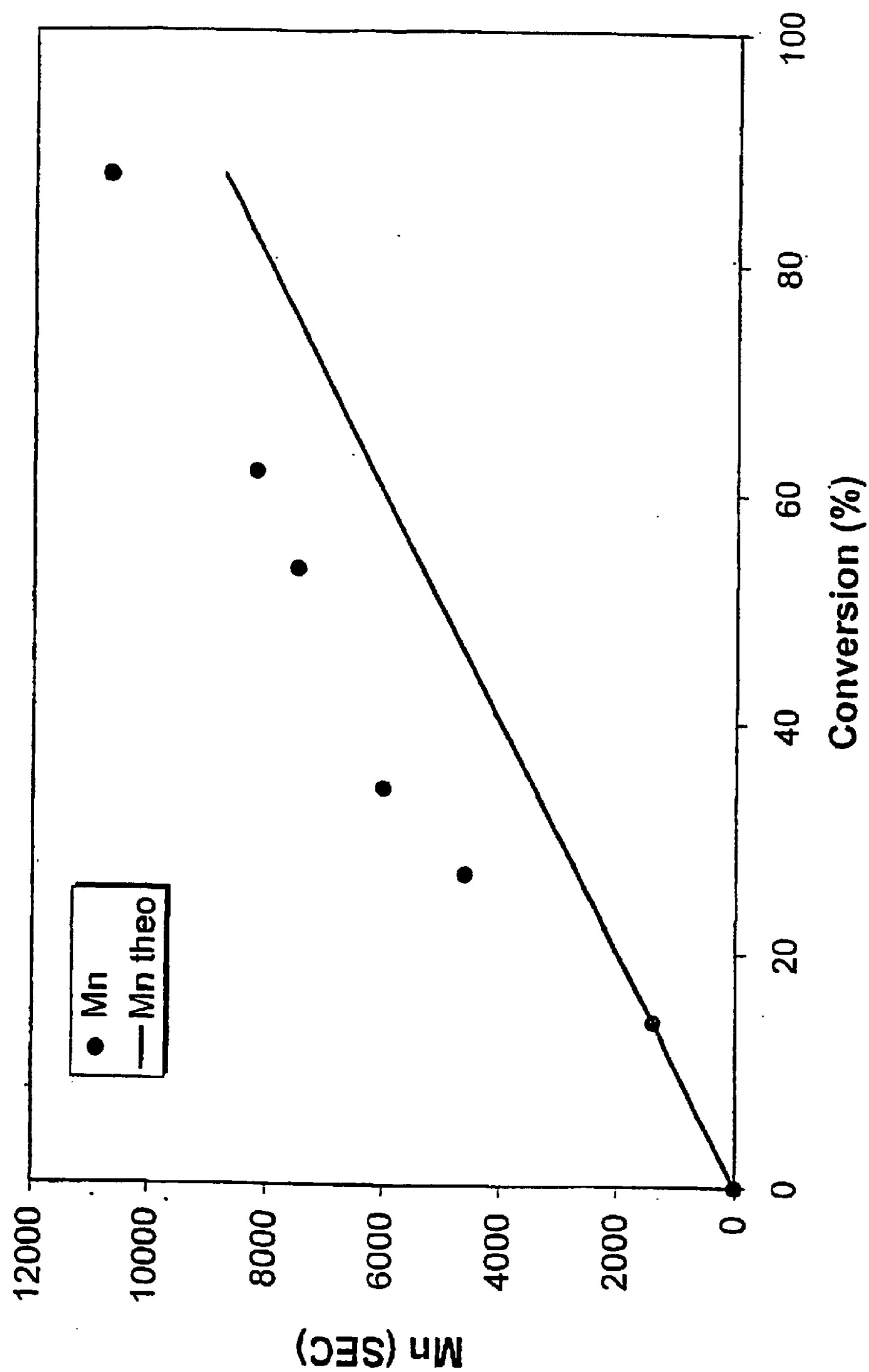

FIG. 3. Evolution of $M_n$ with conversion for the solid support polymerization of MMA at 90° C. in presence of 60% v/v toluene with $^{32}$/[I]=100.

Figure 4:
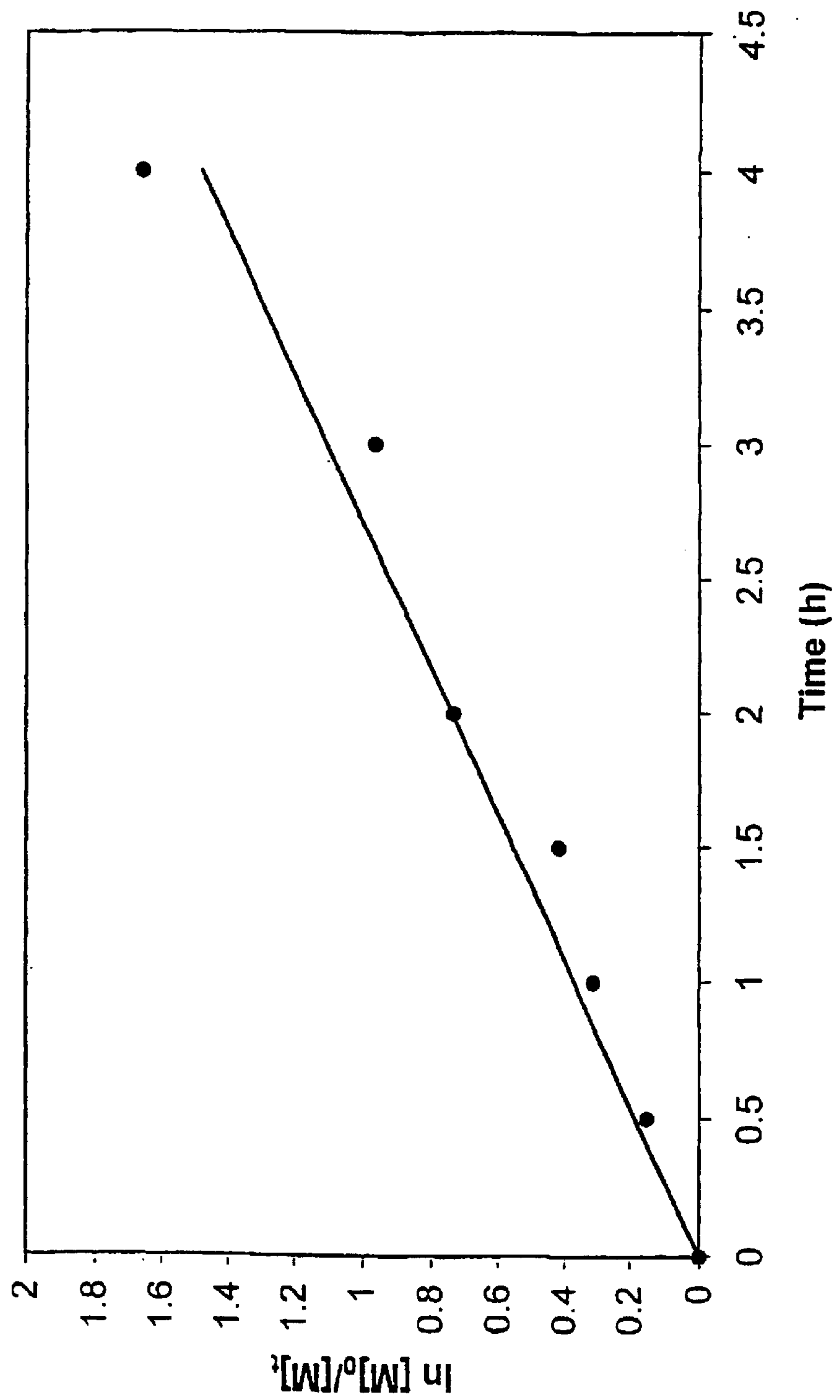

FIG. 4. First order kinetic plot for the solid support polymerization of MMA at 90° C. in presence of 60% v/v toluene with $^{32}$/[I]=100.

Figure 5:
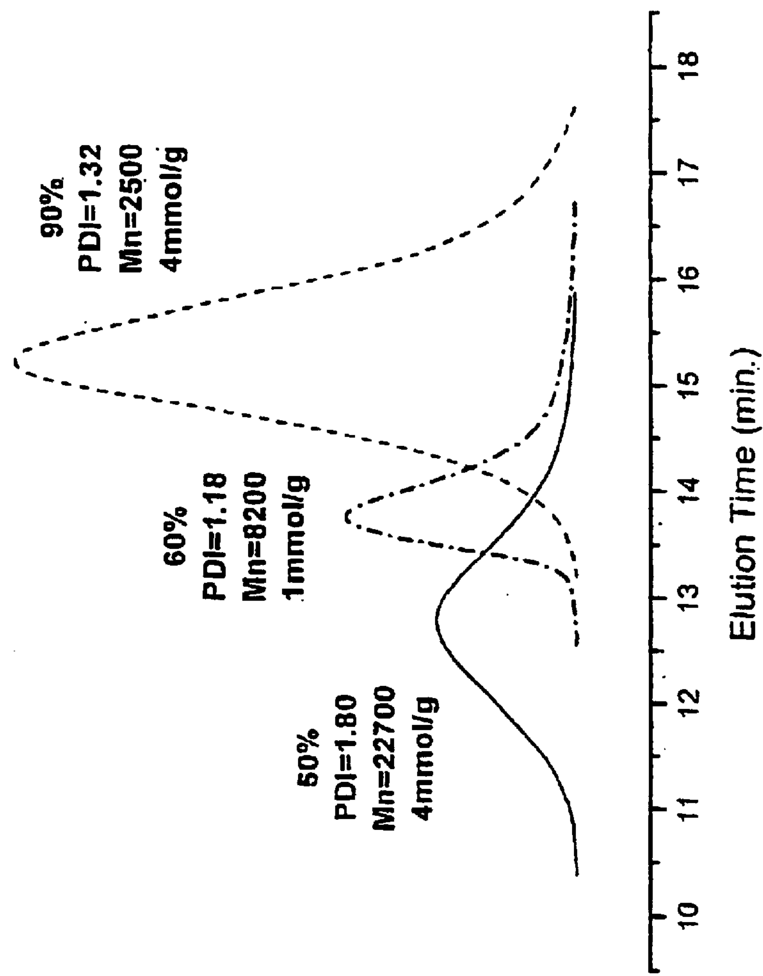

FIG. 5. SEC traces of PMMA following the value of resin load and the percentage of dilution.

Figure 6:
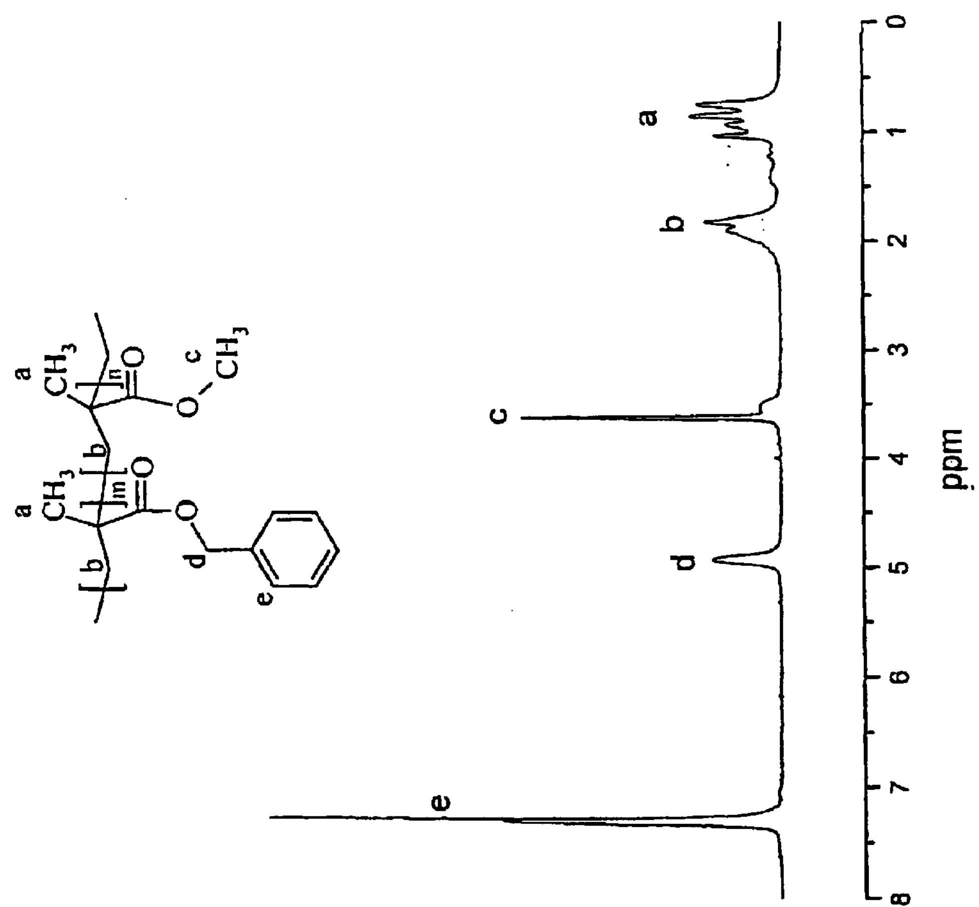

FIG. 6. $^{1}$H NMR of final copolymer PMMA-b-PbzMA.

Figure 7:
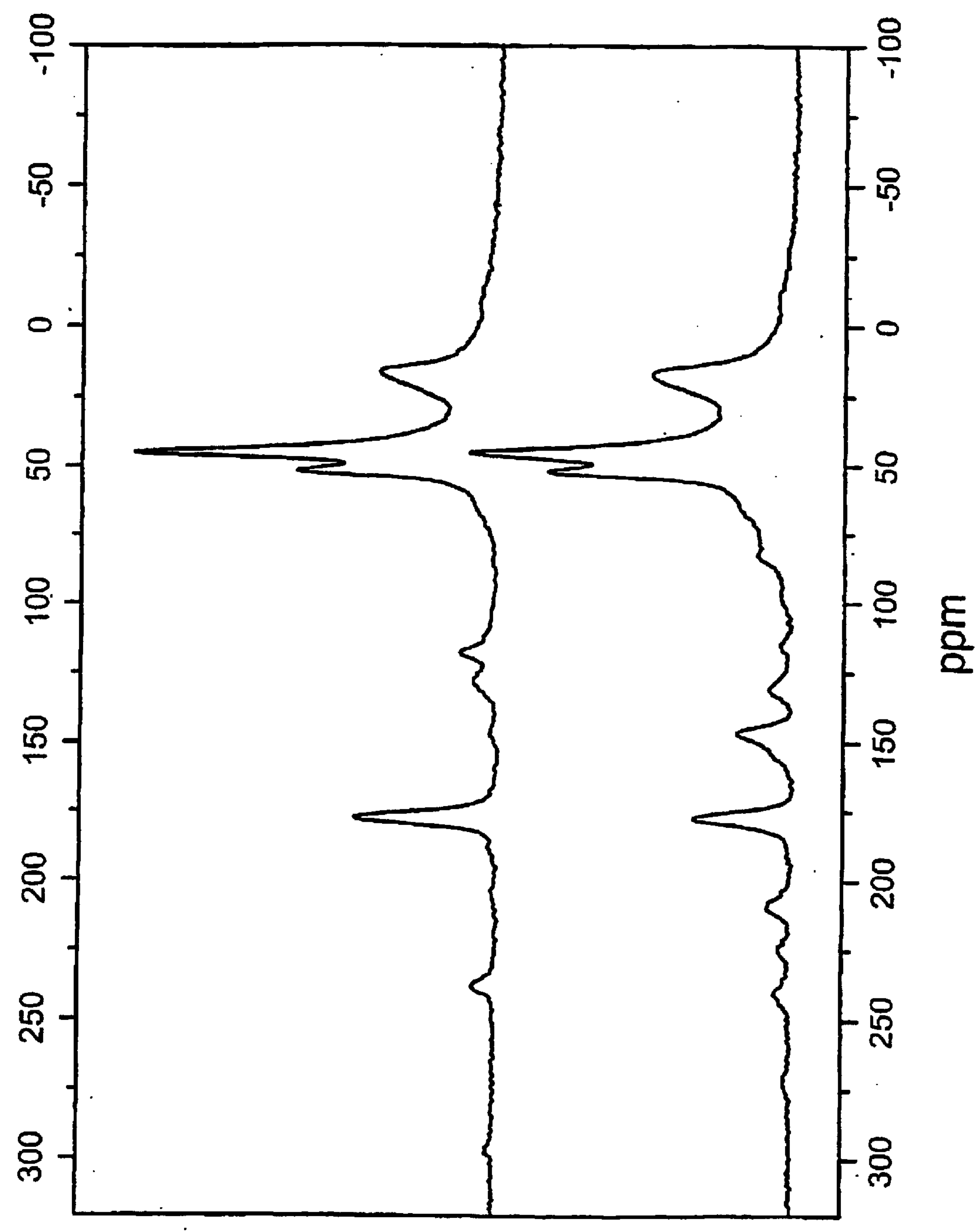

FIG. 7. Solid state NMR of PMMA supported on Wang resin.

Figure 8:
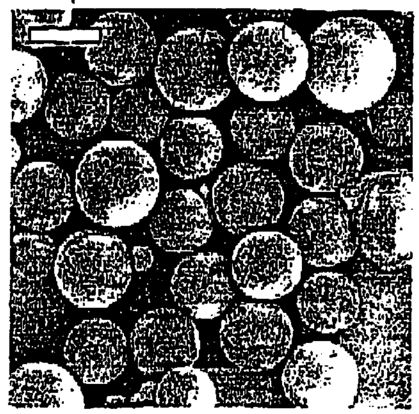
Figure 8:
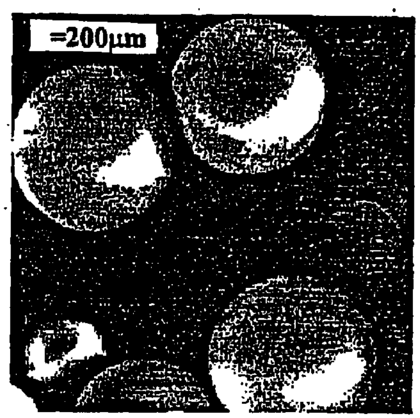
Figure 8:
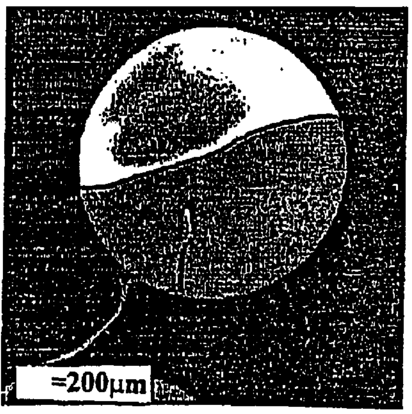
Figure 8:
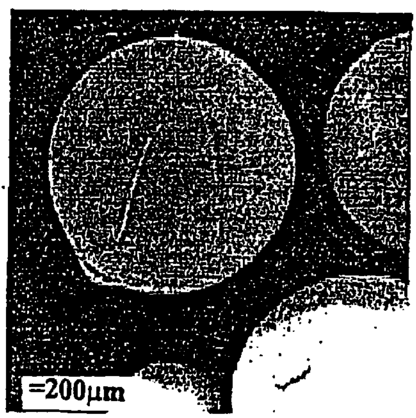

FIG. 8. Scanning Electron Microscopy of (a) Wang resin initiator, (b) PMMA attached to the resin (conversion=34%), (c) PMMA attached to the resin (conversion=87.6%) and (d) PMMA-b-PbzMA (Run 5).

EXPERIMENTAL SECTION

General Information.

Methyl methacrylate (MMA) and benzylmethacrylate (BzMA), supplied by Aldrich (99%) were purified by passing through a column of activated basic alumina to remove inhibitor. CuBr, triethylamine, 2-bromo-iso-butyryl bromide, trifluoroacetic acid (Lancaster), toluene (Fisons, 99.8%) and tetrahydrofuran (BDH) were used as received. N-(n-propyl)-2-pyridylmethanimine ligand was synthesized as previously described. Wang resin was supplied by Zeneca in a range of different load (1 to 4 mmol.g$^{-1}$ of OH functions, range of size 150–300 $\mu$m).

Before polymerization, all solvents, monomers and other reagents were degassed via a minimum of three freeze-pump-thaw cycles. All manipulations were carried out under a nitrogen atmosphere using standard schlenk or syringe techniques.

Synthesis of Wang Resin Initiator.

In a 250 mL three neck flask, equipped with a mechanic stirrer, was added 10 g of Wang resin (1x10$^{-2}$ mol, 1 mmol.g$^{-1}$ OH functions) and 150 mL of tetrahydrofuran. Then, 1.6 mL (1.1 eq) of triethylamine and 1.4 mL of 2-bromo-iso-butyryl bromide (1.1 eq) was added dropwise. The mixture was kept under slow stirring (80 mph) overnight and next filtrate. The insoluble phase was put in another flask in presence of deionized water and kept under mechanical stir during 5 hours to eliminate completely triethylammonium salts. The Wang resin initiator was recover by filtration and dry under vacuum. FT-IR (ATR) $\nu_{max}$/cm$^{-1}$: appearance at 1730 (C═O vibration) and disappearance of hydroxyl functions at 3100–3500. NMR $^{1}$H (CDCl$_3$, 300 MHz) $\delta_{ppm}$: broad peaks. NMR $^{13}$C (CDCl$_3$, 300 MHz) $\delta_{ppm}$: 163.5 (C═O), 130.33 and 115.25 (aromatics carbons), 60.84 (C—Br), 31.24 (CH$_3$).

Homopolymerization Procedure.

A typical polymerization procedure is as follow. In a 250 mL three neck flask, equipped with a mechanic stirrer, was added under nitrogen, 1 g of Wang initiator (1 mmol.g$^{-1}$, 1x10$^{-3}$ mol) and 143 mg of CuBr (1 eq, 1x10$^{-3}$ mol). In a schlenk tube was prepared a solution of 10 mL of methylmethacrylate (MMA) ($M_a$=10000 g.mol$^{-1}$ targeted), 15 mL of anhydrous toluene (60% v/v) and 0.3 mL of N-(n-propyl)-2-pyridylmethanimine (2 eq, 2x10$^{-3}$ mol). Oxygen was removed by three freeze-pump-thaw cycles and the solution added to the flask by syringe. The mixture was kept at 90° C. under constant stirring (145 mph). After a certain time, the charge was cooled and diluted with tetrahydrofuran. The polymer attached to the resin was recovered by filtration and then washed successively with THF, dichloromethane and methanol to remove the excess of ligand and copper. The molecular weight of the PMMA was obtained by cleavage under mild conditions of the ester link between the resin and the polymer.

Cleavage Procedure.

500 mg of the previous polymer was put in a 100 mL flask followed by 10 mL of dichloromethane. Then 10 mL of trifluoroacetic acid was added dropwise. The mixture was kept under stirring at room temperature for 5 hours. The PMMA present in the dichloromethane phase was recovered after filtration, evaporation of the solvent and precipitation in methanol. NMR $^{1}$H (CDCl$_3$, 300 MHz) $\delta_{ppm}$: 0.7–1.1 (CH$_3$), 1.6–2.1 (CH$_2$), 3.6 (OCH$_3$).

Block Copolymerization Procedure.

This is exemplified in Scheme 2:

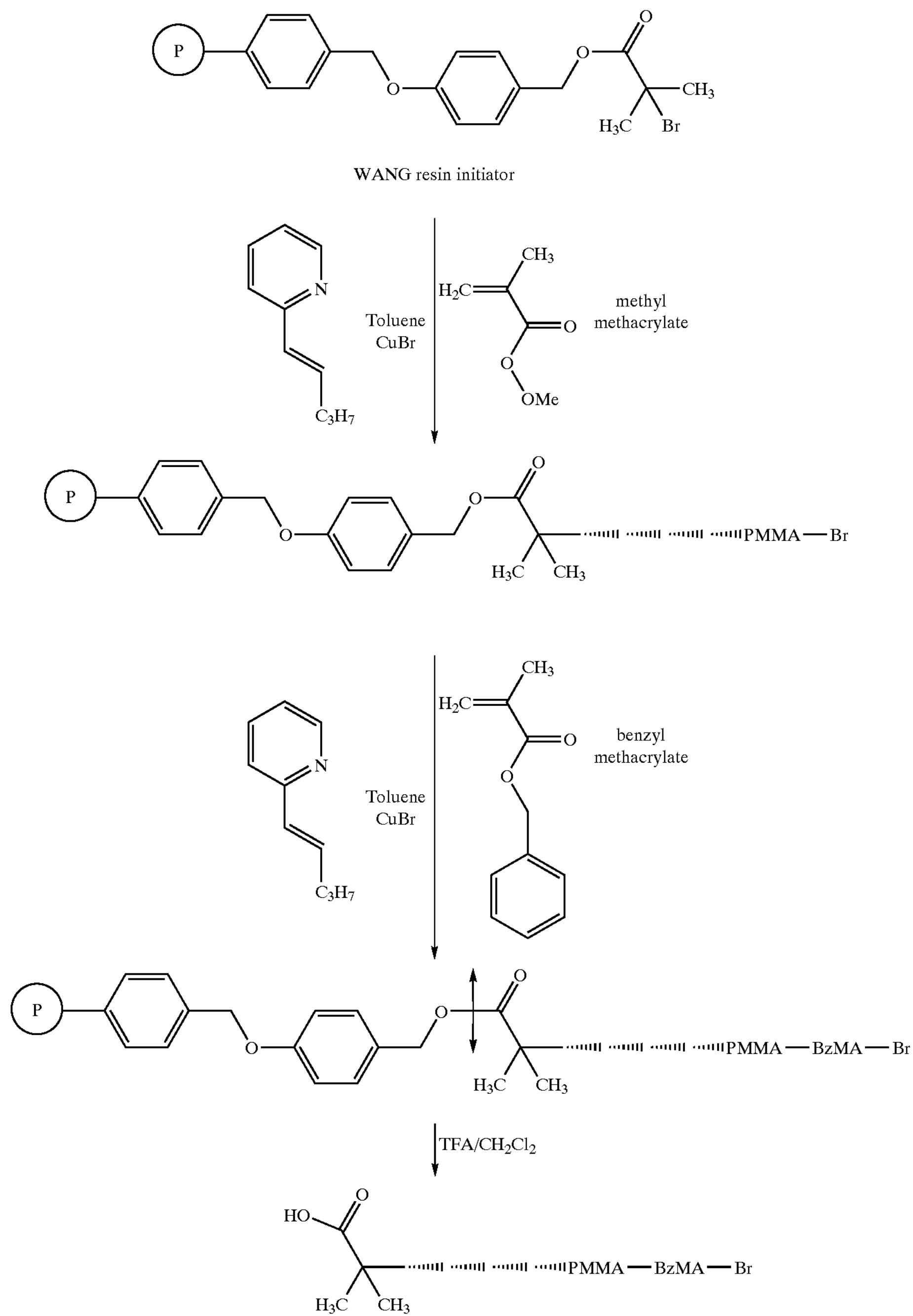

Synthesis of PMMA-b-PBzMA block copolymers by ATP using solid support initiator.

Synthesis of PMMA-b-PBzMA block copolymers by ATP using solid support initiator.

a) continuous process: gradient copolymer. The first block of PMMA was synthesized as previously described. After a certain time at 90° C. (80% conversion of MMA/4 h), 10 mL of benzylmethacrylate ($M_n$=g.mol$^{-1}$ targeted) was added under nitrogen flow and the mixture was stirred at 90° C. for a certain time. The charge was then cooled and the block copolymers attached to the resin recovered after washing with THF, dichloromethane and methanol.

b) two steps process: block copolymer. The first block of PMMA was synthesized as previously described. After a certain time at 90° C. (80% conversion of MMA/4 h), the flask was cooled at room temperature. The liquid phase was removed under nitrogen stream with filter canula and the beads washed four times with degassed toluene. After complete elimination of residual MMA, 143 mg of CuBr was added followed by a degassed solution composed of 15 mL of toluene, 10 mL of benzylmethacrylate and 0.3 mL of N-(n-propyl)-2-pyridylmethanimine. Then, the mixture was reheated at 90° C. for a certain time. The charge was then cooled and the block copolymers attached to the resin recovered after washing with THF, dichloromethane and methanol.

Characterizations.

$^{1}H$ and $^{13}C$ solid state NMR spectroscopy of the compounds attached to the Wang resin were carried out on a 300 MHz Bruker NMR whereas $^{1}H$ NMR of the final block copolymer was carried out in $CDCl_3$ solution on a Br ücker-DPX 300 MHz instrument.

Molecular weight and molecular weight distribution of homopolymers and block copolymers were measured by Size Exclusion Chromatography on a system equipped with a guard column, 2 mixed D columns (Polymer Laboratories), with both DRI and UV detectors and eluted with tetrahydrofuran at 1 $mL.min^{-1}$. Molecular weight was calculated against narrow PMMA standards for DRI and PS standards for UV. Polymer conversion were measured by gravimetry after drying the in a vacuum oven.

DSC of the final block copolymers was carried out on a Perkin Elmer Pyris 1 instrument. Samples underwent 3 heating and cooling stages until final measurements was made between 0 and 150° C. at a heating rate of 20° $C.min^{-1}$.

FTIR spectra of the Wang resin and Wang initiator were recorded on a Brücker VECTOR 22 instrument with fitted an attenuated total reflection (ATR) cell.

Scanning electron microscopy (SEM) of the resin compounds was carried out on a JEOL JSM-6100. The residual copper analysis was determined using a Leeman Labs inductively coupled plasma atomic emission spectrophotometer (ICP-AES) calibrated with Leeman Labs ICP standards.

Results and Discussion

Initiator Synthesis.

Initiator functionalized beads were synthesized from the condensation reaction of Wang resin with a range of hydroxyl loadings (from 1 to 4 mmol $g^{-1}$ of 4-hydroxybenzyl alcohol functionality) and 2-bromo-isobutyrylbromide, by esterification reaction in presence of triethylamine, in tetrahydrofuran suspension at room temperature. This type of tertiary bromide has been widely used for the efficient initiation of living radical polymerisation of various methacrylates with copper (I) bromide in conjunction with alkylpyridylmethanimine ligands. The supported initiator was characterized by FT-IR, gel-phase NMR and cross polarization magic angle spinning (CP/MAS) NMR spectroscopy. Acylation of the resin hydroxyl group by the acyl bromide is observed by the disappearance of the hydroxyl stretch, 3450 $cm^{-1}$, accompanied by the appearance of an intense signal at 1730 $cm^{-1}$ (FIG. 1). Acceptable $^{13}C$ NMR spectra can be obtained at 300 MHz by swelling the beads in $CDCl_3$ and obtaining spectra under conventional solution NMR conditions, gel phase NMR. Gel Phase NMR shows the presence of the initiator moiety, more mobile as compared to the polystyrene core of the beads, with the methyl group, 31.2 ppm, tertiary carbon (—CBr), 60.8 ppm and the carbonyl from the ester, 163 ppm, as would be expected for solution NMR. The polystyrene resin is not observed by this method. CP-MAS solid state NMR study of the resin bound initiator showed the presence of the polystyrene as a broad peak centered around 120 ppm as well as other characteristic peaks (see Figure). The resin was also characterized by scanning electron microscopy (SEM), which shows the spherical nature of the support retained with the size of the beads in the range of 150 to 200 $\mu$m as expected according to the data given by the supplier.

Impact of the Resin Load.

During this study, the load of the resin was revealed as an important parameter to consider because of his influence over the molecular weight distribution of the final polymer. Two different loadings of resin were utilized to prepare as initiators, 4 mmol $g^{-1}$ and 1 mmol $g^{-1}$ of initiating sites so as to investigate the impact of this parameter on the overall kinetic of polymerization. It is noted that supported organic transformations are normally carried out at the lower loadings with higher loading often causing complications due to side reactions. Table 1 reports polymerisation results from these initial experiments. At a loading of 4 mmol g−1 high conversions are reached at 50% v/v concentration after 3 hours. However, at higher dilution, 10% v/v less than 20% conversion is seen after 9 hours. At high dilution an improvement in the PDI of the product is observed but remains approximately 1.3. On decreasing the loading of the initiator over 60% conversion is attained after 3 hours with the cleaved PMMA showing an excellent Pdi of 1.18. At 4 mmol $g^{-1}$ it is envisaged that a high amount of termination occurs due to the close proximity of the propagating chains which would also provide steric constraints within the reaction. A loading of 1 mmol $g^{-1}$ leads to excellent product and all further experiments were carried out on 1 mmol $g^{-1}$ resins. FIG. 5 shows the SEC traces of the final polymers from different loading experiments. A symmetrical peak with a PDI of 1.18 (conversion=62%, 3 hours) in 60% v/v of solvent is seen for 1 mmol $g^{-1}$. PDI increases from 1.18 to 1.36 at 87% of MMA conversion and 1.78 at 93%, Table 1. This increase in PDI is attributed to the increase in viscosity of the reaction medium above approximately 90% conversion which results in inefficient agitation.

TABLE 1

Resin load impact

| Run | Resin load ($mmol.g^{-1}$) | Solvent % v/v | Time (h) | Conversion[a)] % | PDI |
|---|---|---|---|---|---|
| 1 | 4 | 50 | 3 | 80 | 1.80 |
| 2 | 4 | 90 | 5 | 10 | 1.32 |
| 3 | 4 | 190 | 9 | 15 | 1.30 |
| 4 | 1 | 60 | 3 | 61.9 | 1.18 |

Impact of the resin load over the evolution of the polydispersity index.
[a)]obtained by gravimetry.

Cleavage of the Polymer Product from the Resin

In order to follow the polymerization reactions it was necessary to cleave the products from the resin support at their point of attachment. The detached polymer chains could be then analyzed using standard techniques such as size exclusion chromatography (SEC) and NMR, to obtain molecular weight, polydispersity and structural information. The attachment via a benzylic ester linkage allows for the cleavage of the polymer products from the resin support by reaction with an excess of trifluoroacetic acid (TFA). It is noted that the hydrolysis of the backbone ester groups of the polymer e.g. PMMA does not occur by this treatment as attested by $^{1}H$ NMR spectra that confirm the presence of the $—OCH_3$ group, 3.5 ppm, in the final polymers.

Homopolymers.

Polymerization of methyl methacrylate in presence of Wang resin supported initiator was carried out in toluene solution. An important factor, which has to be considered in solid phase organic synthesis, is the swelling of the hydrophobic matrix. Cross-linking polystyrene swells in apolar solvents as toluene or dichloromethane, which allow a higher mobility and availability of the initiating sites to the copper/ligand catalyst and thus increases the efficiency of the initiation. The polymerisation kinetics were followed in 60% v/v of toluene at 90° C. with a resin loading of 1 mmol $g^{-1}$. The $M_n$ of the PMMA increases reasonably linearly with conversion (FIG. 3, Table 2), consistently slightly above the theoretical $M_n$ as is often the case with this type of polymerisation under homogeneous conditions[9]. The first order kinetic plot shows a straight line indicating that the concentration of actives centers remains constant during the polymerization reaction (FIG. 4, Table 2). Under these conditions, the polydispersity of the product obtained is less than 1.3. This result is similar to PMMA obtained from polymerization mediated by silica gel supported catalyst[22] and polymerisation under fluorous biphasic conditions[20].

TABLE 2

PMMA homopolymer

| Time (h) | Conversion (%) | $M_n$ exp[a)] ($g.mol^{-1}$) | $M_n$ theo[b)] ($g.mol^{-1}$) | PDI |
|---|---|---|---|---|
| 0.5 | 14 | 1400 | 1400 | 1.33 |
| 1 | 26.7 | 4600 | 2700 | 1.24 |
| 1.5 | 34.2 | 6000 | 3400 | 1.29 |
| 2 | 53.4 | 7500 | 5400 | 1.27 |
| 3 | 61.9 | 8200 | 6200 | 1.18 |
| 4 | 87.6 | 10700 | 8800 | 1.36 |
| 6.5 | 92.5 | 18900 | 9300 | 1.78 |

Synthesis of poly(methyl methacrylate) by ATP at 90° C. in presence of 60% v/v toluene.
[a)]obtained by SEC calibrated with MMA standards
[b)]calculated from the 32/[I] ratio.

Block Copolymers Synthesis

One of the most useful features of a living polymerization reaction is the ability to synthesize block copolymers. In order to investigate the potential to prepare immobilized block copolymers synthesis of PMMA-b-PBzMA was attempted by a reinitiation experiment. Poly(methyl methacrylate) as prepared immobilized on the Wang resin was isolated still attached to the resin and combined with a solution of toluene, catalyst solution and degassed benzyl methacrylate. The mixture was reheated to 90° C. for 8 hours. Analysis of the cleaved polymer by 2D (Differential refractive index and UV detection) SEC showed a bimodal mass distribution with the presence of the residual PMMA macroinitiator. At present the loss of activity has not been overcome and is ascribed to either termination or deactiviation by oxidation during manipulation.

In order to overcome this difficulty the second monomer, benzyl methacrylate, was added directly in the reaction medium, without prior bead isolating, after approximately 85–90% conversion of MMA (as determined by NMR). This process results in the synthesis of gradient block copolymers since at least 10% of MMA is polymerized in the second block[31]. The SEC trace of this product shows a monomodal, symmetrical peak with a PDI of 1.2. Moreover, the SEC of the block copolymer with both UV and refractive index dual detectors gave identical responses (FIG. 6). This indicates the re-growth of the first PMMA block to give copolymer that contain UV-active chromophores from the aromatic benzyl group across the entire mass envelope, excellent evidence of the formation of the block copolymer, Table 3.

TABLE 3

Block Copolymers PMMA-b-PBzMA.

| Run | Conversion MMA[a)] (%) | Conversion BzMA[b)] (%) | $M_n$ NMR ($g.mol^{-1}$) | $M_n$ exp[c)] ($g.mol^{-1}$) | $M_n$ theo[d)] ($g.mol^{-1}$) | PDI |
|---|---|---|---|---|---|---|
| 5 | 80 | 65 | 15000 | 24000 | 14500 | 1.10 |
| 6 | 82.5 | 79.7 | 22000 | 34000 | 20200 | 1.20 |
| 7 | 93.4 | 85.2 | 28400 | 39000 | 22100 | 1.35 |

Synthesis of poly(methyl Methacrylate)-b-poly(benzyl methacrylate) by ATP at 90° C. in presence of 60% v/v toluene.
[a)]obtained by NMR, $M_n$ MMA targeted 10000 $g.mol^{-1}$
[b)]deduced from total and MMA conversions, $M_n$ BzMA targeted 10000 $g.mol^{-1}$ for run 5 and 15000 $g.mol^{-1}$ for run 6 and 7
[c)]obtained by SEC calibrated with MMA standards
[d)]calculated from the 32/[I] ratio of each block.

Residual Copper in Polymers.

The residual copper content in the polymers was measured using inductively coupled plasma atomic emission spectroscopy (ICP-AES). Two analyses were carried out at different stage: the first one, after recovering the polymer attached on the resin and washing the reaction medium with appropriates solvents and the second one, after cleavage from the resin and precipitation of the final polymer in methanol. The copper content were 0.039 and 0.001% w/w, respectively, which is significantly less than the theoretical value of 1.5% w/w if all the copper remained in the polymer. Thus, the presence of the resin as solid support initiator and the possibility offered to easily wash the polymer attached on beads, allow reducing the copper level in the final polymers by approximately 97%.

Thermal Analysis of Products.

Thermal analysis by DSC of the final polymers gives some important data concerning the arrangement of each block. The block copolymer from experiment 7 gave a single glass transition at 76.8° C. (homopolymers have reported Tg's of 100° C. and 54° C. for MMA and BzMA respectively), FIG. ?. This indicates shows the homogeneous character of the block copolymer. The $T_g$ value increases when the weight fraction of poly(benzyl methacrylate) decreases to give a single $T_g$ at 81.2° C., experiment 6. The predicted $T_g$ of 63.6 and 65.5° C. respectively from the Flory equation.

SEM Study.

The evolution of the shape of the resin support and particularly the growth of the polymer around beads was monitored by SEM at different stages of the polymerization. SEM shows clearly the increase of the size of the beads as conversion of MMA increases. For example, 240 μm at 34% to 370 μm for 87.6% of monomer conversion as compared to 150 μm for the starting material. Moreover, the resin support keeps homogeneous in size and distribution all along the polymerization process, which means that bead behave as a reactor of polymerization. This study revealed also that the polymer is covalently attached to the support and growth apart from the solid support initiator (see FIG. 9).

Solid State NMR Study.

$^1H$ and $^{13}C$ gel-phase NMR have been tried to analyze the resin. This is usually a reliable technique to determine the success or failure of chemical transformations on resin-bound materials. A drawback of the $^{13}C$ method is the low sensitivity inherently linked to 1% natural abundance of $^{13}C$ and to small amount of compound attached to the resin. Consequently, it takes several hours to acquire a spectrum with a suitable signal to noise ratio. The applicability of NMR spectroscopy to resin-supported materials was recently extended through the combination of efficient swelling conditions and Magic Angle Spinning (MAS) techniques.

The technique used here is $^{13}C$ Cross Polarization Magic Angle Spinning NMR ($^{13}C$ CP/MAS/NMR). This technique has been employed to evaluate the structure of our different compound attached to Wang resin as the initiator, the homopoly(methyl methacrylate) and the copolymer poly (methyl methacrylate)-b-poly(benzyl methacrylate).

The MAS NMR technique is a sensitive and nondestructive analytical method to completely characterize molecules covalently anchored to the solid support.

REFERENCES

1) Wang, J. S.; Matyjaszewski, K. *J. Am. Chem. Soc.* 1995, 117, 5614–5615.
2) Patten, T. E.; Matyjaszewski, K. *Accounts of Chemical Research* 1999, 32, 895–903.
3) Matyjaszewski, K. *Curr. Opin. Sol. St. Mat. Sci.* 1996, 1, 769.
4) Sawamoto, M.; Kamigaito, M. *Kobunshi Ronbunshu* 1997, 54, 875.
5) Kato, M.; Kamigaito, M.; Sawamoto, M.; Higashimura, T. *Macromolecules* 1995, 28, 1721–1723.
6) Percec, V.; Barboiu, B.; Kim, H.-J. *J. Am. Chem. Soc.* 1998, 120, 305.
7) Granel, C.; Teyssie, P.; DuBois, P.; Jerome, P. *Macromolecules* 1996. 29, 8576.
8) Moineau, G.; Granel, C.; Dubois, P.; Jerome, R.; Teyssie, P. *Macromolecules* 1998, 31, 542.
9) Haddleton, D. M.; Crossman, M. C.; Dana, B. H.; Duncalf, D. J.; Heming, A. M.; Kukulj, D.; Shooter, A. J. *Macromolecules* 1999, 32, 2110–2119.
10) Haddleton, D. M.; Jasieczek, C. B.; Hannon, M. J.; Shooter, A. J. *Macromolecules* 1997, 30, 2190–2193.
11) Uegaki, H.; Kamigaito, M.; Sawamoto, M. *Journal of Polymer Science Part a—Polymer Chemistry* 1999, 37, 3003–3009.
12) Angot, S.; Murthy, K. S.; Taton, D.; Gnanou, Y. *Macromolecules* 1998, 31, 7218–7225.
13) Ueda, J.; Kamigaito, M.; Sawamoto, M. *Macromolecules* 1998, 31, 6762–6768.
14) Haddleton, D. M.; Edmonds, R.; Heming, A. M.; Kelly, E. J.; Kukulj, D. N. *J. Chem.* 1999, 23, 477–479.
15) Matyjaszewski, K. *Chemistry—a European Journal* 1999, 5, 3095–3102.
16) Matyjaszewski, K.; Miller, P. J.; Fossum, E.; Nakagawa, Y. *Appl. Organonomet Chem.* 1998, 12, 667–673.
17) Jakova, K.; Kops, J.; Chen, X. Y.; Batsberg, W. *Macromolecular Rapid Communications* 1999, 20, 219–223.
18) Yamamoto, S.; Ejaz, M.; Ohno, K.; Tsuji, Y.; Matsumoto, M.; Fukuda, T. *Abstracts of Papers of the American Chemical Society* 1999, 218, 487-POLY.
19) Minoda, M.; Yamada, K.; Miyazaki, M.; Endo, M.; Ohno, K.; Fukuda, T. *Abstracts of Papers of the American Chemical Society* 1999, 218, 486-POLY.
20) Wang, X. S.; Jackson, R. A.; Armes, S. P. *Macromolecules* 2000, 33, 255–257.
21) Ohno, K.; Tsujii, Y.; Fukuda, T. *J. Pol. Sci. A, Pol. Chem.* 1998, 36, 2473–2481.
22) Haddleton, D. M.; Duncalf, D. J.; Kukulj, D.; Radigue, A. P. *Macromolecules* 1999, 32, 4769–4775.
23) Haddleton, D. M.; Kukulj, D.; Radigue, A. P. *Chemical Communications* 1999, 99–100.
24) Kickelbick, G.; Paik, J. J.; Matyjaszewski, K. *Macromolecules* 1999, 32, 2941–2947.
25) Haddleton, D. M.; Jackson, S. G.; Bon, S. A. F. *J. Am. Chem. Soc.* 2000, 122, 1542.
26) Merrifield, R. B. *J. Am. Chem. Soc.* 1966, 85, 2149.
27) Wang, S.-S. *J. Am. Chem. Soc.* 1973, 95, 1328.
28) Haddleton, D. M.; Waterson, C. *Macromolecules* 1999, 32, 8732–8739.
29) Webster, O. W. *Science* 1991, February, 887.
30) Haddleton, D. M.; Jackson, S. G.; Bon, S. A. F. *Journal of the American Chemical Society* 2000, 122, 1542–1543.
31) Matyjaszewski, D. *J. Macromol. Sci., Pure Appl. Chem.* 1997, A34, 1785–1801.
32) Kotani, Y.; Kato, M.; Kamigaito, M.; M, S. *Macromolecules* 1996, 29, 6979.

What is claimed is:

1. A supported initiator for transition metal mediated living free radical and/or atom transfer polymerisation comprising an initiator moiety attached to a support via a selectively cleavable covalent bond.

2. A supported initiator according to claim 1, wherein the initiator moiety comprises an activated halogen atom.

3. A supported initiator according to claim 1, wherein the initiator moiety has the formula:

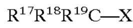

$R^{17}R^{18}R^{19}C—X$ wherein

X is selected from the group consisting of Cl, Br, I, $OR^{20}$, $SR^{21}$, $SeR^{21}$, $OP(═O)R^{21}$, $OP(═O)R^{21}$, $OP(═O)(OR^{21})_2$, $OP(═O)O^{21}$, $O—N(R^{21})_2$ and $S—C(═S)N(R^{21})_2$, wherein $R^{20}$ is a $C_1$–$C_{20}$ alkyl, wherein one or more of the hydrogen atoms may be independently replaced by halide, and wherein $R^{21}$ is an aryl or a straight or branched $C_1$–$C_{20}$ alkyl group and when an $(NR^{21})_2$ group is present, the two $R^{21}$ groups may be joined to form a 5- or 6-membered heterocyclic ring; and $R^{17}$, $R^{18}$ and $R^{19}$ are each independently selected from the group consisting of H, halogen, $C_1$–$C_{20}$ alkyl, $C_3$–$C_8$ cycloalkyl, $C═YR^{22}$, $C(═Y)NR^{23}R^{24}$, COCl, OH, CN, $C_2$–$C_{20}$ alkenyl, $C_2$–$C_{20}$ alkynyl, oxiranyl, glycidyl, aryl, heterocyclyl, aralkyl, aralkenyl, $C_1$–$C_6$ alkyl in which one or more hydrogen atoms are replaced with halogen and $C_1$–$C_6$ alkyl substituted with from 1 to 3 substitutions selected from the group consisting of alkoxyl, aryl, heterocyclyl, $C(═Y)R^{22}$, $C(═Y)NR^{23}R^{24}$, oxiranyl and glycidyl;

wherein $R^{22}$ is $C_1$–$C_{20}$ alkyl, $C_1$–$C_{20}$ alkoxy, aryloxy or heterocyclyloxy; and $R^{23}$ and $R^{24}$ are independently H or $C_1$–$C_{20}$ alkyl or $R^{23}$ and $R^{24}$ may be joined together to form an alkylene group of 2 to 5 carbon atoms, thus forming a 3- to 6-membered ring;

wherein Y may be $NR^{25}$ or O, wherein $R^{25}$ is H or straight or branched $C_1$–$C_{20}$ alkyl or aryl;

such that no more than two of $R^{17}$, $R^{18}$ and $R^{19}$ are H, and wherein at least one of $R^{17}$, $R^{18}$ or $R^{19}$ is attached to the support, optionally via the selectively cleavable link.

4. A supported initiator according to claim 1, wherein the initiator moiety is selected from the group consisting of:

Formula 2

RX

Formula 3

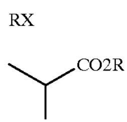

Formula 4

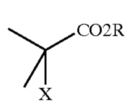

Formula 5

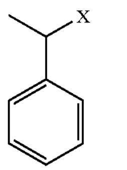

Formula 6

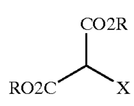

Formula 7

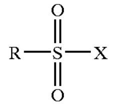

Formula 8

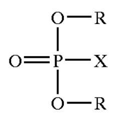

Formula 9

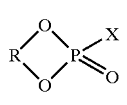

Formula 10

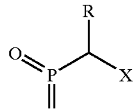

Formula 11

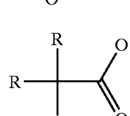

Formula 12

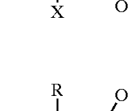

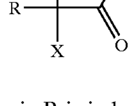

wherein R is independently selected from straight, branched or cyclic alkyl, hydrogen, substituted alkyl, hydroxyalkyl, carboxyalkyl or substituted benzyl, wherein at least one R is attached to the support via the selectively cleavable link; and wherein X is a halide.

5. A supported initiator according to claim 1, wherein the initiator moiety is 1,1,1-trichloroacetone.

6. A supported initiator according to claim 1, wherein the amount of initiator loading on the support is 0.01 to 4 mmol $g^{-1}$, with respect to the total mass of the support, of initiating sites.

7. A supported initiator according to claim 1, wherein the selectively cleavable link is an acid-labile link.

8. A supported initiator according to claim 1, wherein the support is a sheet or bead.

9. A supported initiator according to claim 1, wherein the support is inorganic.

10. A supported initiator according to claim 1, wherein the support is a cross-linked organic polymer.

11. A supported initiator according to claim 1, wherein the support is solvent swellable.

12. A supported initiator according to claim 1, having the formula:

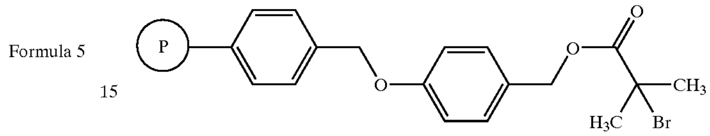

wherein P is a polymeric support.

13. A method for polymerising one or more olefinically unsaturated monomers comprising the steps of:

(i) providing a supported initiator according to claim 1;

(ii) reacting the supported initiator with at least one monomer in the presence of a catalyst to form a polymer attached to the support; and (iii) removing the support from the polymer by cleaving the selectively cleavable link.

14. A method according to claim 13, wherein the polymer is cleaved from the supported by cleaving with acid.

15. A method according to claim 13, wherein a gradient polymer is formed by reacting the supported initiator with a first monomer and then adding a second monomer prior to completion of the polymerisation reaction with the first monomer.

16. A method according to claim 13, wherein the supported initiator is:

(a) reacted with a first monomer, wherein any remaining first monomer is removed before termination of its polymerisation reaction; and (b) reacted with a second monomer to form a block copolymer.

17. A method according to claim 13, wherein the catalyst comprises a ligand which is any N-, O-, P- or S-containing compound which can coordinate in a δ-bond to a transition metal or any carbon-containing compound which can coordinate in a π-bond to a transition metal, such that direct bonds between the transition metal and growing polymer radicals are not formed.

18. method according to claim 13, wherein the catalyst comprises:

(a) a first compound MY, wherein M is a transition metal having an oxidation state which is capable of being oxidised by one formal oxidation state, and Y is a mono, divalent or polyvalent counterion; and (b) an organodiimine, wherein at least one of the nitrogens of the diimine is not part of an aromatic ring.

19. A method according to claim 13, wherein the catalyst comprises a first component of the formula:

$$[ML_m]^{n+}A^{n-}$$

wherein M=a transition metal having an oxidation state which is capable of being oxidised by one formal oxidation state, L=an organodiimine, wherein at least one of the nitrogens of the diimine is not part of an aromatic ring, A=an anion, n=an integer of 1 to 3, and m=an integer of 1 to 2.

20. A method according to claim 17, wherein the transition metal is selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{3+}$, $Mn^{4+}$, $Rh^{3+}$, $Rh^{4+}$, $Re^{2+}$, $Re^{3+}$, $Co^{+}$, $Co^{2+}$, $V^{2+}$, $V^{3+}$, $Zn^{+}$, $Zn^{2+}$, $Au^{+}$, $Au^{2+}$, $Ag^{+}$ and $Ag^{2+}$.

21. A method according to claim 13, wherein the catalyst is:

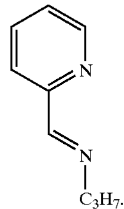

with Cu Br.

22. A method according to claim 13, wherein the initiator has the general formula:

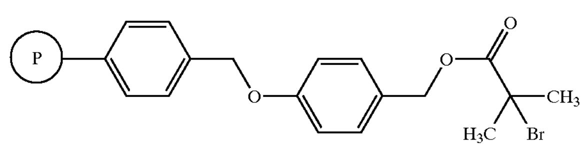

wherein P is a polymeric support.

23. A method according to claim 13, wherein the amount of initiator loading on the support is less than 4 mmol $g^{-1}$ of initiating sites.

24. A method for synthesising a supported initiator as defined in claim 1, comprising the steps of:

(i) providing a support having one or more reactive groups; and (ii) reacting the support with an initiator precursor to form the supported initiator.

25. A method according to claim 24, wherein the support has the formula:

S—OH, wherein S is the support, and the initiator precursor has the formula:

I-Hal, wherein I is the initiator and Hal is a halogen, and the halogen and hydroxyl group react to form the formula:

S—O—I.

26. A method according to claim 24, comprising reacting:

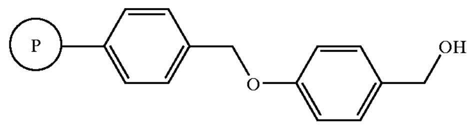

wherein

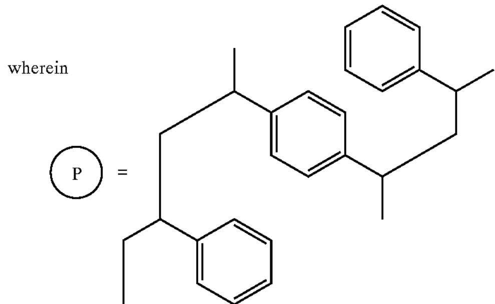

with initiator:

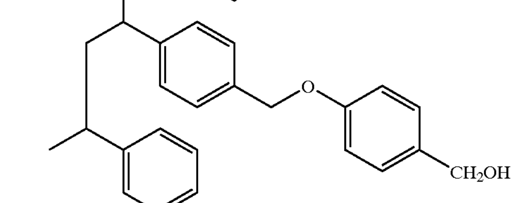

to form a supported initiator of the formula:

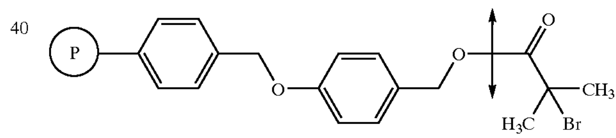

wherein the arrow indicates the site of the selectively cleavable link.

27. A supported initiator according to claim 1, additionally comprising a polymer extending from the initiator moiety.

* * * * *